United States Patent [19]

Ishii et al.

[11] Patent Number: 5,162,091
[45] Date of Patent: Nov. 10, 1992

[54] POLYESTER FIBERS AND PROCESS OF MAKING

[75] Inventors: Yasuo Ishii, Wakayama; Tsutomu Tanaka, Aichi; Nobuyuki Suzuki; Shigetoshi Suzue, both of Wakayama, all of Japan

[73] Assignee: Kao Corporation, Tokyo, Japan

[21] Appl. No.: 667,393

[22] PCT Filed: Aug. 3, 1990

[86] PCT No.: PCT/JP90/00993

§ 371 Date: Apr. 2, 1991

§ 102(e) Date: Apr. 2, 1991

[87] PCT Pub. No.: WO91/02111

PCT Pub. Date: Feb. 21, 1991

[30] Foreign Application Priority Data

Aug. 4, 1989 [JP] Japan .................. 1-202538
Aug. 4, 1989 [JP] Japan .................. 1-202539
Aug. 4, 1989 [JP] Japan .................. 1-202540

[51] Int. Cl.$^5$ .......................... D01D 5/12; D01F 1/10
[52] U.S. Cl. ........................... 264/210.6; 264/210.8; 264/211; 524/89; 524/167; 524/367; 524/368; 524/369; 524/370; 528/308; 528/308.1
[58] Field of Search ............... 264/210.6, 210.8, 211; 524/89, 167, 367, 368, 369, 370; 528/308, 308.1

[56] References Cited

U.S. PATENT DOCUMENTS 3,627,867 12/1971 Schwarz .................. 264/210.8

FOREIGN PATENT DOCUMENTS 48-76944 10/1973 Japan .
58-179623 10/1983 Japan .
62-64826 3/1987 Japan .

OTHER PUBLICATIONS

The Merck Index, p. 599 (11th ed. 1989).
Abstract of JP-A 58-93752 (Jun. 3, 1983).
Abstract of JP-B 57-2824 (Jan. 19, 1982).
Abstract of JP-A 62-18463 (Jan. 27, 1987).

*Primary Examiner*—Leo B. Tentoni
*Attorney, Agent, or Firm*—Birch, Stewart, Kolasch & Birch

[57] ABSTRACT

Polyester fibers produced by adding a compound of the following general formula (1), (2) or (3) to a polyester (a) comprising ethylene terephthalate as the main recurring unit and melt-spinning the resulting composition:

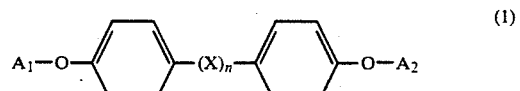

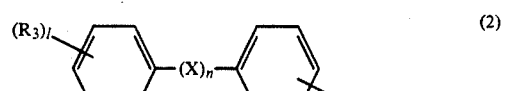

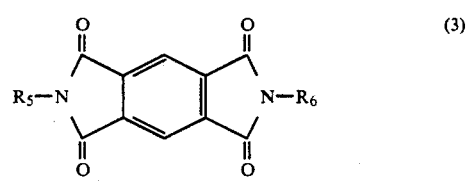

which can be easily spun and have an excellent hand.

19 Claims, 1 Drawing Sheet

POLYESTER FIBERS AND PROCESS OF MAKING

FIELD OF INDUSTRIAL APPLICATION

The present invention relates to a melt-viscosity depressant for polyester resins and a polyester fiber having a high tenacity which can be produced easily by spinning.

PRIOR ART

Polyester resins are widely used as the materials for synthetic fibers and it is believed that in order to increase the tenacity of a synthetic fiber, the degree of polymerization of the polymers should be increased. However, when the degree of polymerization of the polymer is increased, the melt viscosity thereof is increased as a matter of course, which impairs the workability thereof and thereby reduces productivity. Although elevation of the melting temperature is one of the means for reducing the melt viscosity, the decomposition of the resin is accelerated at a high temperature to reduce the degree of polymerization, of the polymer. Thus the object, i.e. the production of a fiber having a high degree of polymerization, cannot be attained.

Polyester filaments having a high degree of polymerization are used in the field of industrial high-tenacity yarns. It is necessary to further increase the tenacity thereof and, for this purpose, the melt viscosity of the resin should be reduced. When the melt viscosity of a polymer used as the material for staple fibers is reduced, the extrudability through a nozzle is improved or the mechanical power necessitated for the extrusion is reduced, thus contributing to the enhancement of productivity.

In the field of high-speed spinning recently employed in practice, the reduction in the melt viscosity of the resin is effective in increasing the extrusion rate.

Although the use of a lubricant was proposed in order to solve this problem, it was found that when a lubricant such as ethylenebisstearamide, stearic acid or stearyl alcohol was incorporated into the resin, not only the melt viscosity thereof, but also the degree of polymerization thereof was reduced.

Meanwhile polyester fibers essentially have a poor hand and are apt to jar. Means for solving this problem include an increase in the fineness of the fibers, an alkaline weight reduction of the fibers, and treatment of the fibers with a softener.

The increase in fiber fineness is described in "Senshoku Kogyo (Dyeing industry)", Vol. 38, pages 288 to 299, by Shigenobu Kobayashi et al., the alkaline weight reduction is described in J. Soc. Dyers Colorists', Vol. 78, page 9 (1962) by I. E. Haden and in The Textile Mfr., page 293 (July, 1963) by B. C. . Dorset, and treatment with a softener is described in U.S. Pat. No. 3,377,249.

DISCLOSURE OF THE INVENTION

Objects of the present invention are to find a melt-viscosity depressant capable of reducing the melt viscosity of a polyester resin without essentially reducing the degree of polymerization thereof, and to facilitate the production of a polyester fiber having a high tenacity by spinning by using the melt-viscosity depressant.

Compounds (1), (2) and (3) to be used in the present invention are disclosed in Japanese Patent Laid-Open Nos. 93752/1983, 2824/1982 and 18463/1987, respectively.

The present invention provides a process for producing a polyester fiber which comprises adding a compound (b) of the following general formula (1), (2) or (3) to a polyester (a) comprising ethylene terephthalate as the main recurring unit and melt-spinning the resulting composition:

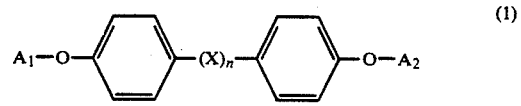
(1)

wherein $A_1$ and $A_2$ each represent an alkyl group having 6 to 18 carbon atoms or an arylalkyl group, n represents 0 or 1, and X represents

—S—, —SO$_2$—or —O— in which $R_1$ and $R_2$ each represent H or an alkyl group having 4 or fewer carbon atoms,

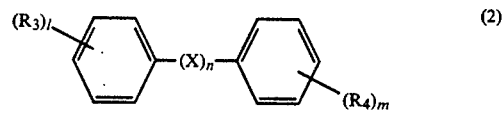
(2)

wherein $R_3$ and $R_4$ each represent an alkyl group having 6 to 18 carbon atoms, l and m each represent such an integer that l+m is 1 to 3, and n and X are as defined above, and

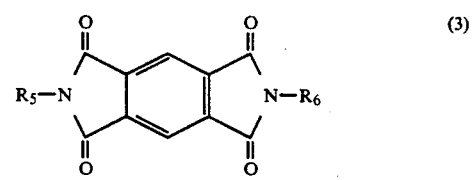
(3)

wherein $R_5$ and $R_6$ each represent a straight-chain alkyl group having 12 to 22 carbon atoms. In the present invention, it is preferred that after the addition of the compound of the general formula (1) or (2) followed by melt spinning, the filaments are pre-hot-drawn at 60° to 100° C. and then heat-treated at 150° to 250° C. under tension.

The starting polyester resin preferably has a limiting viscosity of at least 0.8 in phenol/tetrachloroethane (60/40) at 25° C.

The draw ratio is preferably at least 4.

The present invention provides also a polyester fiber produced by the above-described process. The polyester fiber thus produced preferably has a tenacity of at least 7 g/d.

DETAILED DISCLOSURE OF THE INVENTION

The present invention provides a melt-viscosity depressant for polyester resins which comprises a compound of the general formula (1):

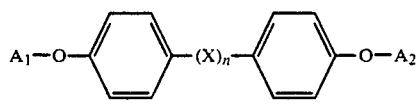  (1)

wherein $A_1$ and $A_2$ each represent an alkyl group having 6 to 18 carbon atoms or an arylalkyl group, n represents 0 or 1, and X represents

—S—, $SO_2$— or —O— in which $R_1$ and $R_2$ each represent H or an alkyl group having 4 or fewer carbon atoms, or general formula (2):

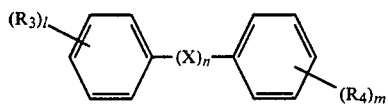  (2)

wherein $R_3$ and $R_4$ each represent an alkyl group having 6 to 18 carbon atoms, l and m each represent such an integer that l+m is 1 to 3, and n and X are as defined above, and a polyester fiber produced by mixing the melt-viscosity depressant into a starting polyester resin to form a polyester resin composition, and melt-spinning this composition.

The number of carbon atoms in $A_1$ and $A_2$ of the compound of the formula (1) of the present invention can be freely selected in the above-described range. When the number of carbon atoms in $A_1$ or $A_2$ is less than 6, the molecular weight is so low that the resin will boil at the melting temperature to form bubbles, while when it exceeds 18, the compatibility thereof with the resin is reduced and therefore no satisfactory effect can be obtained. Examples of $A_1$ and $A_2$ include straight-chain alkyl groups such as n-hexyl, n-octyl, n-dodecyl and n-octadecyl groups; branched alkyl groups such as 2-hexyldecyl and methyl-branched octadecyl groups; and arylalkyl groups such as benzyl and 2-phenylethyl groups.

The compound of the general formula (1) of the present invention can be easily produced by reacting an aromatic glycol of the formula:

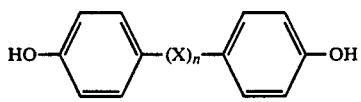

with an alkyl halide having 6 to 18 carbon atoms and/or an arylalkyl halide in the presence of an alkali catalyst such as NaOH or KOH.

Examples of the compounds of the general formula (1) of the present invention include those given below:

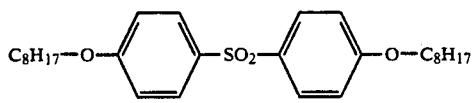

(hereinafter referred to as the invention compound ①),

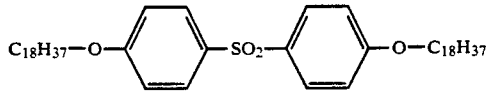

(hereinafter referred to as the invention compound ②),

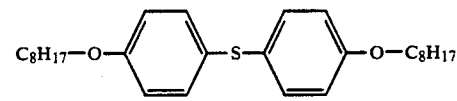

(hereinafter referred to as the invention compound ③),

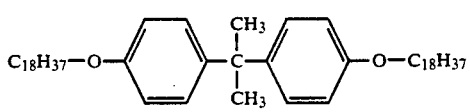

(hereinafter referred to as the invention compound ④),

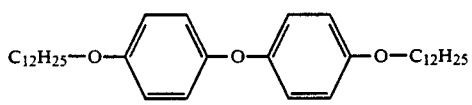

(hereinafter referred to as the invention compound ⑤),

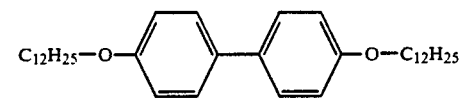

(hereinafter referred to as the invention compound ⑥), and

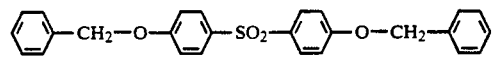

(hereinafter referred to as the invention compound ⑦).

$R_3$ and $R_4$ of the compound of the formula (2) of the present invention are each a straight-chain or branched alkyl group and the number of carbon atoms thereof can be freely selected in the above-described range. When the number of carbon atoms in $R_3$ or $R_4$ is less than 6, the molecular weight is so low that the resin will boil at the melting temperature to form bubbles, while when it exceeds 18, the compatibility thereof with the resin is reduced and therefore no satisfactory effect can be obtained. Examples of $R_3$ and $R_4$ include hexyl, octyl, dodecyl and octadecyl groups.

The compound of the general formula (2) of the present invention can be easily produced by a known process. For example, it is produced by reacting biphenyl, diphenyl ether or diphenyl sulfide with an α-olefin having 6 to 18 carbon atoms in the presence of a catalyst such as aluminum chloride or boron trifluoride/ethyl ether.

Examples of the compounds of the general formula (2) of the present invention include those given below:

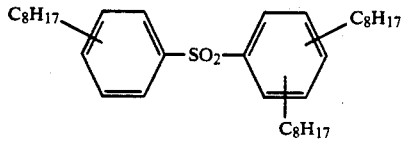

(hereinafter referred to as the invention compound (8)),

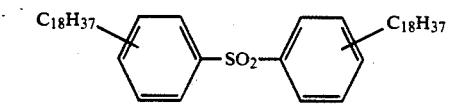

(hereinafter referred to as the invention compound (9)),

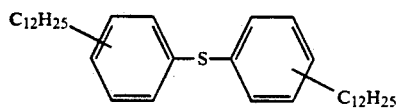

(hereinafter referred to as the invention compound (10)),

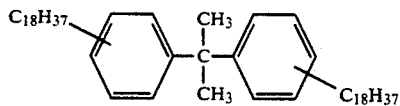

(hereinafter referred to as the invention compound (11)),

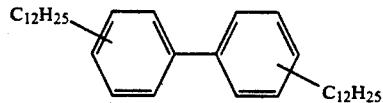

(hereinafter referred to as the invention compound (12)),

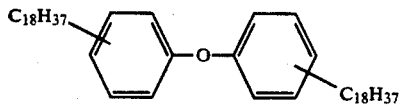

(hereinafter referred to as the invention compound (13)),

Namely, the present invention provides the above-described melt-viscosity depressant for polyester resins which comprises a compound of the general formula (3):

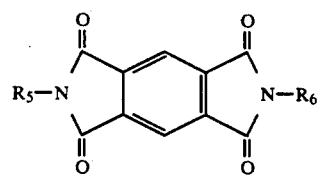

wherein $R_5$ and $R_6$ each represent a straight-chain alkyl group having 12 to 22 carbon atoms, and a polyester fiber produced by mixing the melt-viscosity depressant for polyester resins into a starting polyester resin and melt-spinning the obtained polyester resin composition.

The number of carbon atoms in $R_5$ and $R_6$ of the compound of the formula (3) of the present invention can be freely selected in the above-described range. When the number of carbon atoms in $R_5$ or $R_6$ is less than 12, the molecular weight is so low that the resin will boil at the melting temperature to form bubbles, while when it exceeds 22, the compatibility thereof with the resin is reduced and therefore no homogeneous mixture thereof with the resin can be easily obtained.

The compound of the general formula (3) of the present invention can be easily produced by reacting 1 mol of pyromellitic anhydride with 2 mol of an amine having 12 to 22 carbon atoms to form a dicarboxylic diamide and condensing it through dehydration.

The polyester resin used as the starting material in the present invention preferably comprises polyethylene terephthalate as the main recurring unit and its limiting viscosity in phenol/tetrachloroethane (weight ratio: 60/40) is preferably at least 0.8 at 25° C. When the limiting viscosity of the starting polyester resin is less than 0.8, the melt viscosity of the polyester resin is not so high that the productivity is seriously reduced and the intended high tenacity cannot be obtained in some cases.

Polyesters which are copolymers with, for example, sodium sulfoisophthalate are also usable and they are dyeable with a cationic dye.

The melt-viscosity depressant of the present invention can be added to a polyester resin to form a homogeneous mixture. It scarcely fumes or colors even upon exposure to a high temperature in the melt-spinning step, namely, it has an excellent heat resistance.

High-tenacity polyester fibers can be produced from the polyester resin composition containing the melt-viscosity depressant of the present invention.

Further, polyester fibers having a good hand can be produced from the polyester resin composition containing the melt-viscosity depressant of the general formula (3).

It is indispensable to use chips of a high polymer in the production of the high-tenacity fibers. In spinning the polymer chips, they are melted usually at 280° to 300° C. The melt viscosity of the high polymer is increased due to intertwinement of the polymer chains themselves and, therefore, elevation of the extrusion pressure and impairment of the spinnability are caused. However, when the melt-viscosity depressant of the present invention is used, the spinning pressure and the tension of the filament are reduced to make the spinning smooth.

The filaments extruded through a nozzle are temporarily cooled to solidify them. The crystallization in the cooling step is not preferred when polyethylene terephthalate resin or the like is melt-spun, while the acceleration of the crystallization in the cooling step is preferred for improving the moldability when the polyester resin is injection-molded. The melt-viscosity depressant of the present invention does not cause any crystallization of the resin in the step of cooling the filaments from the spinning nozzle. The undrawn filaments thus cooled and taken up are subjected to orientation crystallization in the subsequent stretching/heat treatment step to form high-tenacity filaments.

To exhibit the intended effect of the melt-viscosity depressant of the present invention, the depressant must be added in an amount of 0.1 to 10 parts (by weight, the same shall apply hereinafter), preferably 0.5 to 5 parts, to 100 parts of the polyester resin. When the amount is less than 0.1 part, the effect thereof can hardly been expected, while when it exceeds 10 parts, the properties of the resin are adversely affected.

The melt-viscosity depressant of the present invention may be added to the starting polyester resin in the course of the production of the resin or in a suitable step after the production thereof, or it may be mixed into resin pellets or molten resin in the spinning step.

The high-tenacity fibers of the present invention are produced by homogeneously mixing the starting polyester resin with the melt-viscosity depressant of the present invention, melt-spinning the mixture, cooling the filaments, and drawing and heat-treating them. The filaments thus spun are cooled, taken up temporarily as undrawn filaments, subjected to pre-hot-drawing and then heat-treated under tension. Alternatively, the filaments are not taken up but taken off with a take-off roller and then drawn and heat-treated with a hot roller.

The drawing and heat treatment can be conducted in the same manner as that of ordinary polyester fibers. A preferred preheating temperature in the drawing step is 60° to 100° C. and a preferred heat treatment temperature is 150° to 250° C. To obtain high-tenacity fibers, the draw ratio is desirably at least 4.

The polyester resin according to the present invention is preferably one comprising polyethylene terephthalate as the main recurring unit. It may also be a polyester resin partially copolymerized with, for example, polyethylene glycol, POE(2) bisphenol A, sodium sulfoisophthalate or 1,4-butanediol.

The polyester fibers dyeable with a cationic dye according to the present invention are those produced from a polyester resin partially copolymerized with sodium sulfoisophthalate or the like as a constituent.

EXAMPLES

Figure 1:
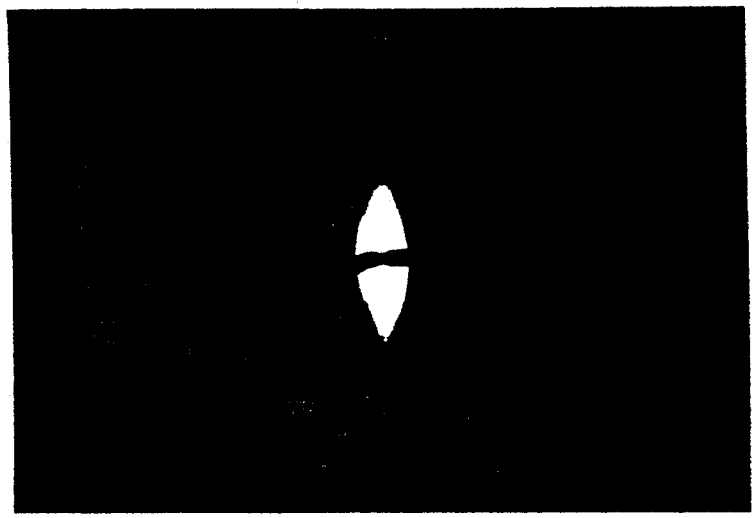
FIGS. 1 and 2 are X-ray photographs showing small-angle X-ray scattering images of the filaments drawn 4 fold obtained in Comparative Example 2 and Example 6.

The following Examples will further illustrate the present invention, which by no means limit the invention.

EXAMPLE 1

Each compound listed in Table 1 was added to polyethylene terephthalate resin and melt-mixed in an extruder. The resulting strands were cooled with water and cut to form samples. The melt flow index of the resin composition was determined in terms of the amount of a molten resin extruded through an orifice having a diameter of 2.095 mm and a length of 8 mm at a temperature of 275° C by application of a load of 2160 g in 10 min. The higher the melt flow index, the lower the melt viscosity. After the determination of the melt flow index, the sample was dissolved in a solution of phenol/tetrachloroethane (60/40) to determine the limiting viscosity [η] at 25° C. When the value of [η] of the sample is equal to that of an additive-free polyethylene terephthalate resin, the resin may be deemed to be essentially free from a reduction in the degree of polymerization. The results are given in Table 1.

TABLE 1

| Compound | Amount (weight % based on resin) | Melt flow index (cm³/10 min) | [η] (dl/g) |
| --- | --- | --- | --- |
| not added | — | 12.1 | 0.771 |
| invention compound ① | 3 | 23.1 | 0.770 |
| invention compound ① | 5 | 38.2 | 0.768 |
| invention compound ② | 5 | 35.7 | 0.771 |
| invention compound ③ | 5 | 38.4 | 0.768 |
| invention compound ④ | 5 | 34.1 | 0.767 |
| invention compound ⑤ | 5 | 37.1 | 0.772 |
| invention compound ⑥ | 5 | 36.2 | 0.770 |
| invention compound ⑦ | 5 | 35.9 | 0.766 |
| invention compound ⑧ | 5 | 36.5 | 0.768 |
| invention compound ⑨ | 5 | 34.8 | 0.770 |
| invention compound ⑩ | 5 | 35.8 | 0.767 |
| invention compound ⑪ | 5 | 34.1 | 0.770 |
| invention compound ⑫ | 5 | 35.5 | 0.770 |
| invention compound ⑬ | 5 | 36.4 | 0.767 |

Results

The compounds of the present invention are capable of reducing the melt viscosity without essentially reducing the limiting viscosity, and facilitate the spinning of polyesters having a high melt viscosity.

EXAMPLE 2

100 parts by weight of polyethylene terephthalate resin having a limiting viscosity of 1.2 was dry-blended with 5 parts by weight of the invention compound ①. The blend was placed in an extruder-type melt-spinning machine and extruded at a rate of 3 g/m through a spinning nozzle having a diameter of 0.5 mm while keeping the temperature of the spinning section at 290° C. The filaments thus formed were taken up at a rate of 1000 m/min at a distance of 2.5 m beneath the nozzle. The undrawn filaments thus taken up were drawn 5-fold in an oil bath at 80° C. and then heat-treated at 170° C. for 30 min while keeping the filament length constant.

In the spinning step, the pressure in the nozzle was 65 kgf/cm², the limiting viscosity of the undrawn filament was 0.98, and the tenacity of the drawn filament was 9.5 g/d.

COMPARATIVE EXAMPLE 1

The same experiment as that of Example 2 was repeated without addition of the invention compound ①.

In the spinning step, the pressure in the nozzle was 100 kgf/cm², the limiting viscosity of the undrawn filament was 0.97, and the tenacity of the drawn filament was 9.7 g/d.

EXAMPLE 3

The same experiment as that of Example 2 was repeated except that the invention compound (2) was used.

In the spinning step, the pressure in the nozzle was 60 kgf/cm², the limiting viscosity of the undrawn filament was 0.98, and the tenacity of the drawn filament was 9.4 g/d.

EXAMPLE 4

The same experiment as that of Example 2 was repeated except that the invention compound ⑧ was used.

In the spinning step, the pressure in the nozzle was 65 kgf/cm², the limiting viscosity of the undrawn filament was 0.98 and the tenacity of the drawn filament was 9.5 g/d.

It is apparent from Examples 2 to 4 that by adding the melt-viscosity depressant for polyester resins according to the present invention, the spinning nozzle pressure can be remarkably reduced and the production of high-molecular, high-tenacity polyester fibers is facilitated.

EXAMPLE 5

Each compound listed in Table 2 was added to polyethylene terephthalate resin and melt-mixed in an extruder. The resulting strands were cooled with water and cut to form samples. The melt flow index of the resin composition was determined in terms of the amount of a molten resin extruded through an orifice having a diameter of 2.095 mm and a length of 8 mm at a temperature of 275° C. by application of a load of 2160 g in 10 min. The higher the melt flow index, the lower the melt viscosity. After the determination of the melt flow index, the sample was dissolved in a solution of phenol/tetrachloroethane (60/40) to determine the limiting viscosity [η] at 25° C. When the value of [η] of the sample is equal to that of an additive-free polyethylene terephthalate resin, the resin may be deemed to be essentially free from a reduction in the degree of polymerization. The results are given in Table 2.

RESULTS

The compounds of the present invention are capable of reducing the melt viscosity without essentially reducing the limiting viscosity and are effective in reducing the resin spinning pressure and also for increasing the spinning speed.

EXAMPLE 6

Distearylpyromellitic acid diimide of the following formula:

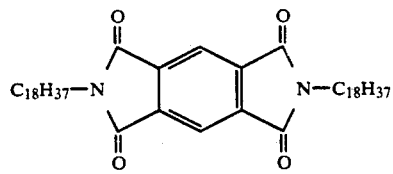

was added to 100 parts by weight of a polyester resin having a limiting viscosity of 1.0 and melt-mixed in an extruder. The resulting strands were cooled with water and cut to form chips. The limiting viscosity of the chip was 0.85. The chips were placed in an extruder-type melt-spinning machine and extruded at a rate of 2 g/min through a spinning nozzle having a diameter of 0.5 mm while keeping the temperature of the spinning section at 290° C. The filaments thus formed were taken up at a rate of 1000 m/min at a distance of 2.5 m beneath the nozzle. The undrawn filaments thus taken up were drawn with various draw ratios in an oil bath at 80° C. and then heat-treated at 170° C. for 30 min while keeping the filament length constant.

In the spinning step, the pressure in the nozzle was 50 kgf/cm² and the limiting viscosity of the undrawn filament was 0.70.

TABLE 2

| Compound | Amount (weight % based on resin) | Melt flow index (cm³/10 min) | [η] (dl/g) |
| --- | --- | --- | --- |
| not added | — | 12.1 | 0.771 |
| 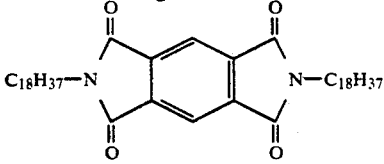 | 3 | 27.5 | 0.772 |
| " | 5 | 34.1 | 0.770 |
| 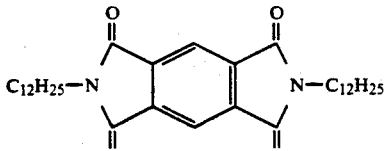 | 5 | 35.6 | 0.767 |
| 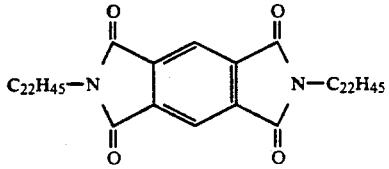 | 5 | 35.2 | 0.771 |

The frequency of end breakage and the tenacity of the filament of each of various draw ratios during the drawing and heat treatment are given in Table 3.

TABLE 3

| Draw ratio | 3.5 | 4 | 4.5 | 5 | 5.5 |
|---|---|---|---|---|---|
| Frequency of end breakage* | ○ | ○ | ○ | ○ | Δ |
| Tenacity of filament (g/d) | 4.1 | 4.7 | 5.0 | 5.4 | 5.6 |

*○: no breakage at all
Δ: partial breakage

When the undrawn filaments and drawn filaments were thoroughly washed with carbon tetrachloride, they had a very soft hand and were free from jarring peculiar to the polyesters.

COMPARATIVE EXAMPLE 2

The same procedure as that of Example 6 was repeated except that 100 parts by weight of a polyester resin having a limiting viscosity of 1.0 was used without any additive.

The limiting viscosity of the chips once molten was 0.85, the pressure of the nozzle was 75 kgf/cm² in the spinning step, and the limiting viscosity of the undrawn filament wad 0.67.

The frequency of end breakage and the tenacity of the filament of each of various draw ratios during the drawing and heat treatment are given in Table 4.

TABLE 4

| Draw ratio | 3.5 | 4 | 4.5 | 5 | 5.5 |
|---|---|---|---|---|---|
| Frequency of end breakage* | ○ | ○ | ○ | Δ | x |
| Tenacity of filament (g/d) | 4.2 | 4.5 | 4.8 | 5.0 | — |

*○: no breakage at all
Δ: partial breakage
x: breakage in most cases

After the undrawn filaments and drawn filaments were thoroughly washed with carbon tetrachloride, they were apt to jar.

It is apparent from Example 6 and Comparative Example 2 that distearylpyromellitic acid diimide as the melt-viscosity depressant for the polyester resins according to the present invention is effective in reducing the extrusion pressure in the spinning step and also in improving the hand thereof to realize an excellent hand which is unchanged even after washing with carbon tetrachloride. It is also apparent that this melt-viscosity depressant is effective in reducing the frequency of end breakage during the drawing step to increase the draw ratio and that the tenacity of the filament is not impaired by the addition of the compound of the present invention.

These characteristics of the compounds of the present invention are exhibited supposedly because the distribution of orientation in the system are unique.

Figure 2:
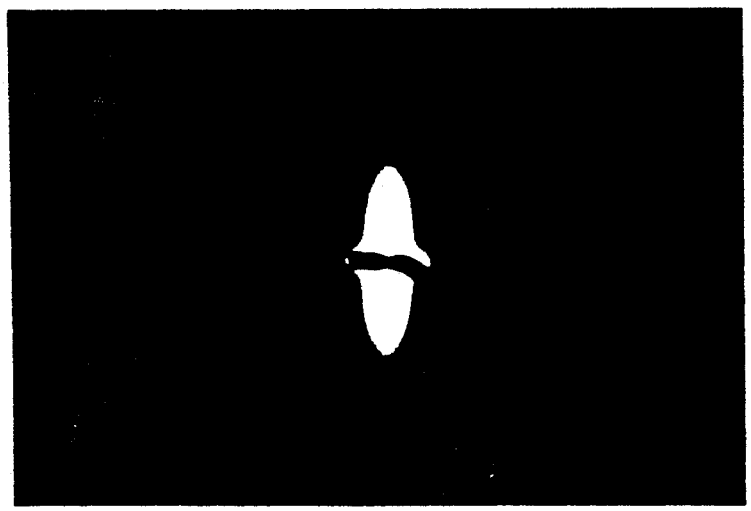

FIGS. 1 and 2 are X-ray photographs showing small-angle X-ray scattering images obtained in Comparative Example 2 and Example 6, respectively.

It is apparent from FIG. 2 that the filament containing distearylpyromellitic acid diimide forms a diffraction image oriented outside the long-period diffraction image of the polyester. This peak corresponding to spacing 47 Å corresponds to the long-period diffraction of distearylpyromellitic acid diimide per se. It is thus apparent that this compound is oriented to be crystallized in the polyester fibers.

EXAMPLE 7

The same experiment as that of Example 6 was repeated except that each compound listed in Table 5 was used in place of distearylpyromellitic acid diimide to examine the nozzle pressure in the spinning step, the limiting viscosity of the undrawn filament, and the hand of the same.

The results are given in Table 5.

TABLE 5

| Compound | Nozzle pressure (kgf/cm²) | Limiting viscosity (dT{g}) | Hand |
|---|---|---|---|
| 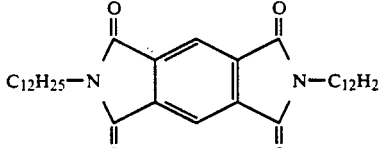 | 48 | 0.68 | good |
| 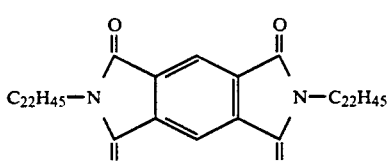 | 52 | 0.67 | good |

We claim:

1. A process for producing a polyester fiber, which comprises:
   (a) adding to a polyester resin comprising ethylene terephthalate as the main recurring unit a compound of formula (1)

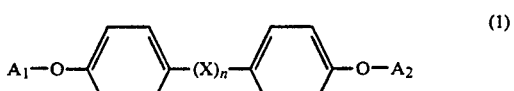

(1)

wherein $A_1$ and $A_2$ each represent an alkyl group having 6 to 18 carbon atoms or an arylalkyl group, n represents 0 or 1, and X represents

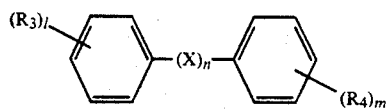

—S—, —SO$_2$—, or —O—, wherein R$_1$ and R$_2$ each represent H or an alkyl group having 1–4 carbon atoms;
or a compound of formula (2)

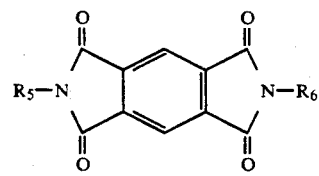

wherein R$_3$ and R$_4$ each represent an alkyl group having 6 to 18 carbon atoms, l and m each represent an integer such that l+m is 1 to 3, and n and X are defined above;
or a compound of formula (3)

wherein R$_5$ and R$_6$ each represent a straight-chain alkyl group having 12 to 22 carbon atoms; and
(b) melt-spinning the resulting composition to form said fiber.

2. The process according to claim 1 wherein, after the addition of said compound of formula (1) or (2) followed by said melt spinning, the fibers are pre-hot-drawn at 60° to 100° C. and then heat-treated at 150° to 250° C. under tension.

3. The process according to claim 1 wherein the said polyester resin has a limiting viscosity of at least 0.8 in phenol/tetrachloroethane (60/40) at 25° C.

4. The process according to claim 2 wherein the draw ratio is at least 4.

5. A polyester fiber produced by the process as set forth in claim 1.

6. The polyester fiber as set forth in claim 5 which has a tenacity of at least 7 g/d.

7. A polyester fiber produced by the process as set forth in claim 1 which is dyeable with a cationic dye.

8. The process according to claim 1, wherein the compound added in step (a) has the formula

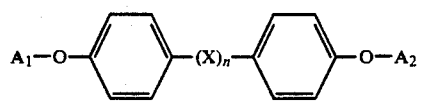

wherein A$_1$ and A$_2$ are straight chain alkyl groups having 8 to 12 carbon atoms.

9. The process according to claim 1, wherein the compound added in step (a) is selected from the group consisting of a compound having the formula

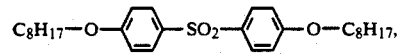

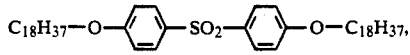

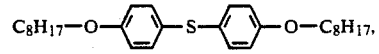

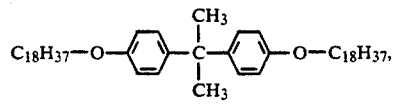

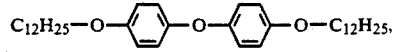

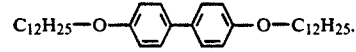

and

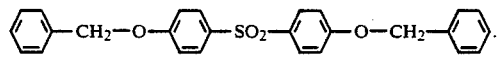

10. The process according to claim 8, wherein the compound added in step (a) is selected from the group consisting of a compound having the formula

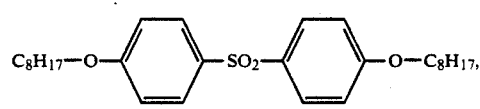

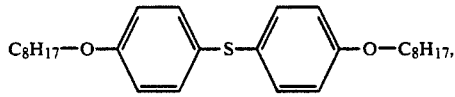

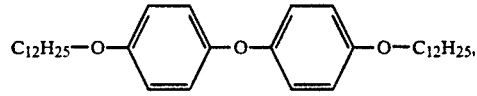

and

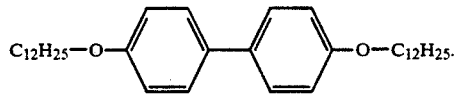

11. The process according to claim 1, wherein the compound added in step (a) is selected from the group consisting of a compound having formula

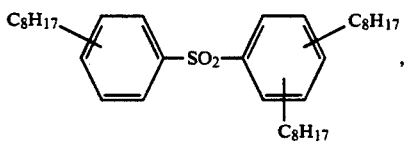

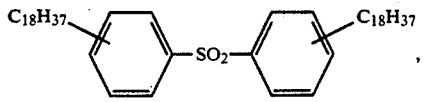

-continued

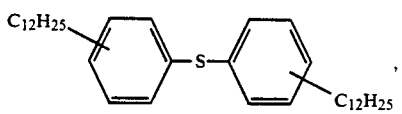

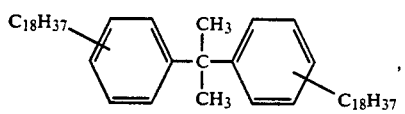

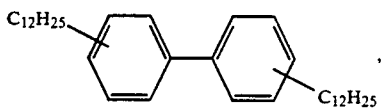

and

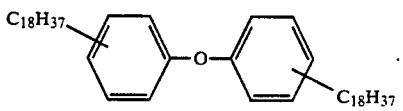

12. The process according to claim 1, wherein the compound added in step (a) is selected from the group consisting of a compound having formula

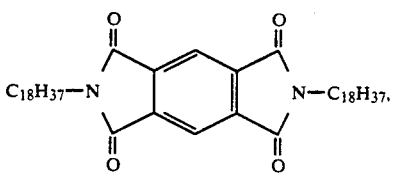

-continued

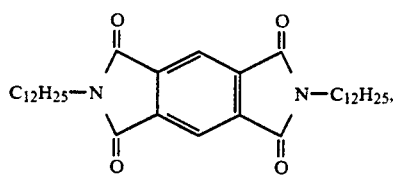

and

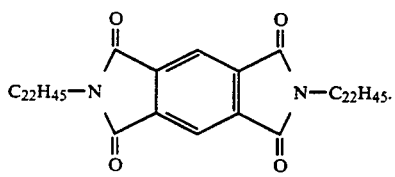

13. The process according to claim 1, wherein said compound (1), (2), or (3) is added in an amount of 0.1 to 10 parts by weight per 100 parts of said polyester resin.

14. The process according to claim 13, wherein said compound (1), (2), or (3) is added in an amount of 0.5 to 5 parts by weight per 100 parts of said polyester resin.

15. A polyester fiber produced by the process as set forth in claim 8.

16. A polyester fiber produced by the process as set forth in claim 9.

17. A polyester fiber produced by the process as set forth in claim 10.

18. A polyester fiber produced by the process as set forth in claim 11.

19. A polyester fiber produced by the process as set forth in claim 12.

* * * * *